March 5, 1963 M. L. HUREL ETAL 3,080,137
AIRCRAFT HAVING A LIFT PRODUCING ROTOR DISPOSED IN THE WING
Filed Nov. 14, 1958 5 Sheets-Sheet 1
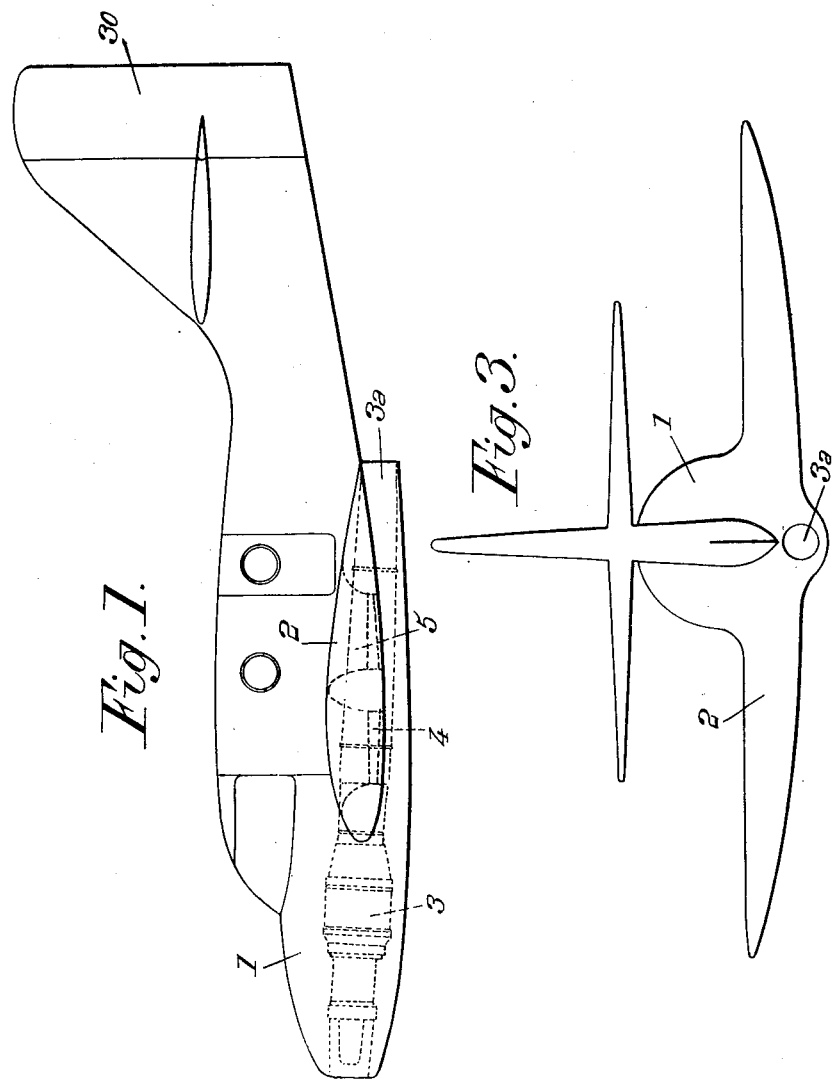
INVENTORS
Maurice Louis Hurel
Jean Henri Bertin
Marcel Pierre LeNabour
BY
Bailey, Stephens + Huettig
ATTORNEYS

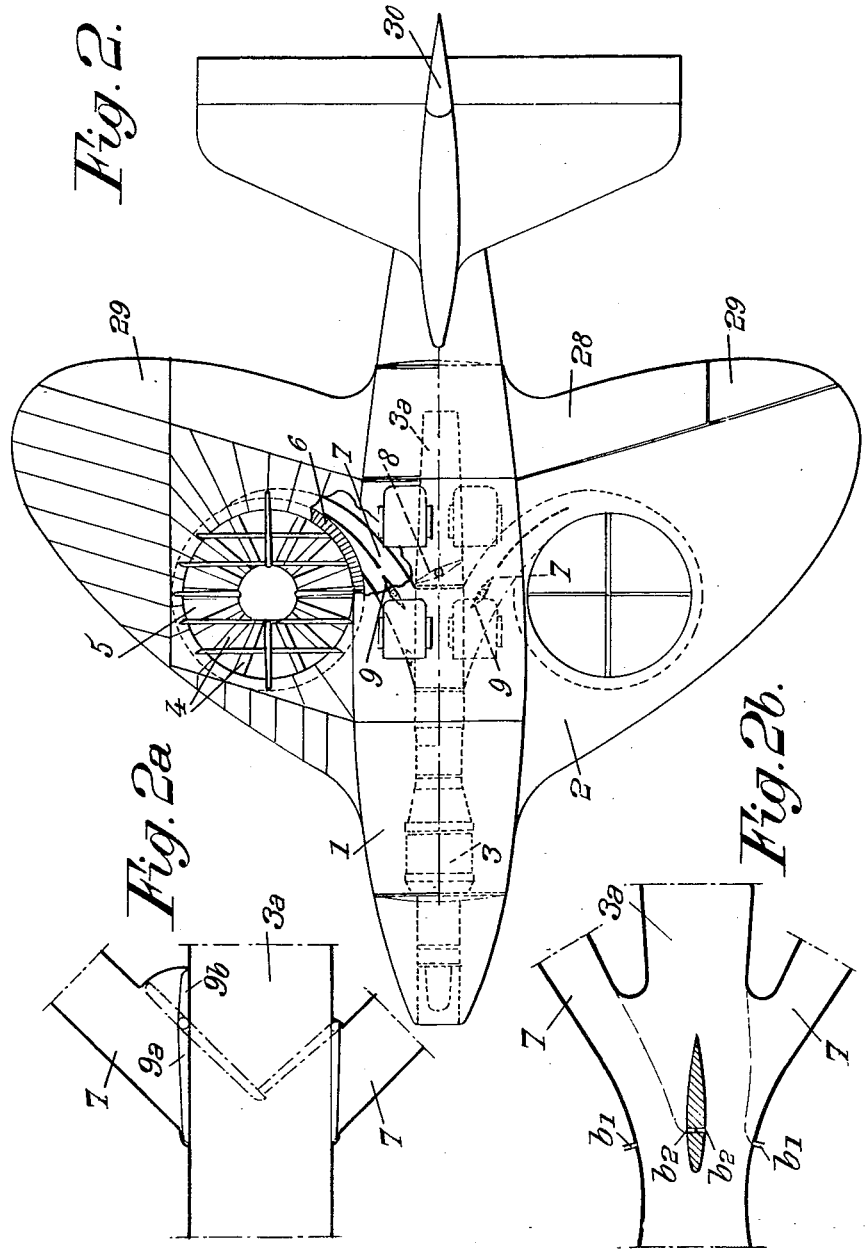

March 5, 1963  M. L. HUREL ETAL  3,080,137
AIRCRAFT HAVING A LIFT PRODUCING ROTOR DISPOSED IN THE WING
Filed Nov. 14, 1958  5 Sheets-Sheet 3
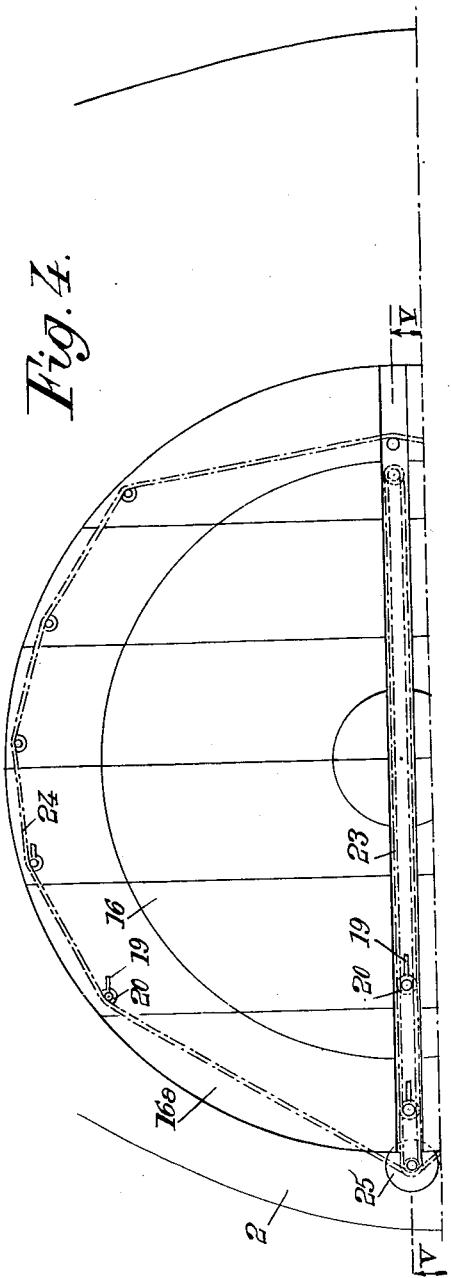
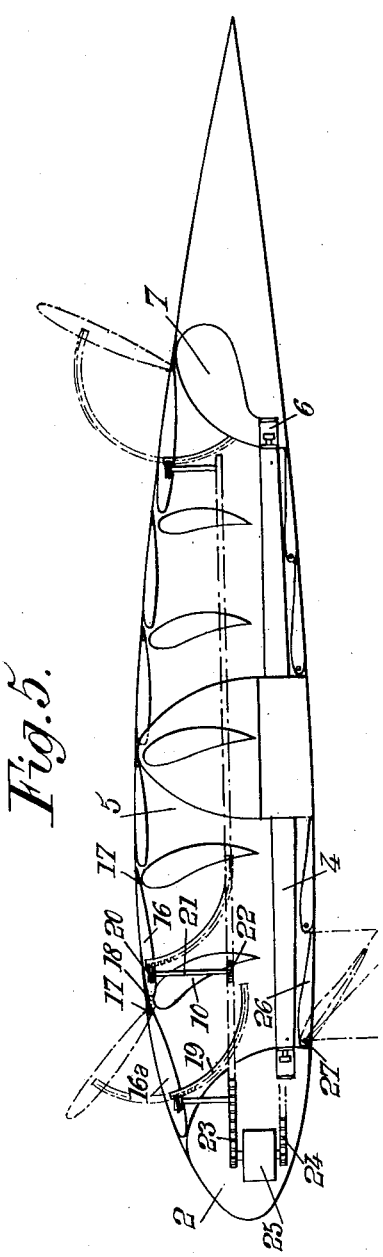
INVENTORS
Maurice Louis Hurel
Jean Henri Bertin
Marcel Pierre Le Nabour
BY
Bailey, Stephens + Huettig
ATTORNEYS March 5, 1963  M. L. HUREL ETAL  3,080,137
AIRCRAFT HAVING A LIFT PRODUCING ROTOR DISPOSED IN THE WING
Filed Nov. 14, 1958  5 Sheets-Sheet 4
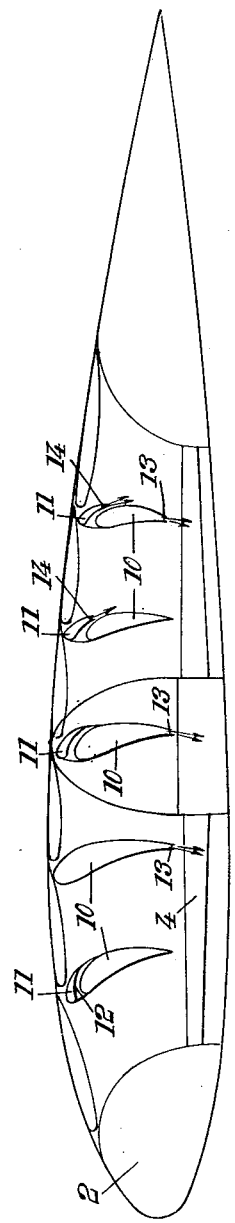
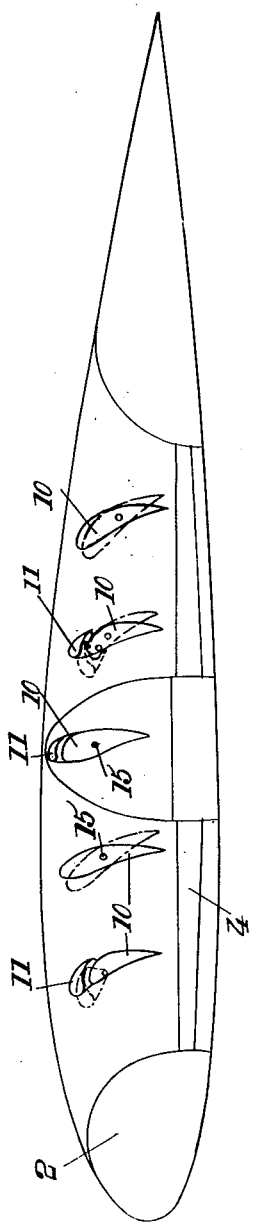
INVENTORS
Maurice Louis Hurel
Jean Henri Bertin
Marcel Pierre Le Nabour
BY
Bailey, Stephens + Huettig
ATTORNEYS March 5, 1963 M. L. HUREL ETAL 3,080,137
AIRCRAFT HAVING A LIFT PRODUCING ROTOR DISPOSED IN THE WING
Filed Nov. 14, 1958 5 Sheets-Sheet 5
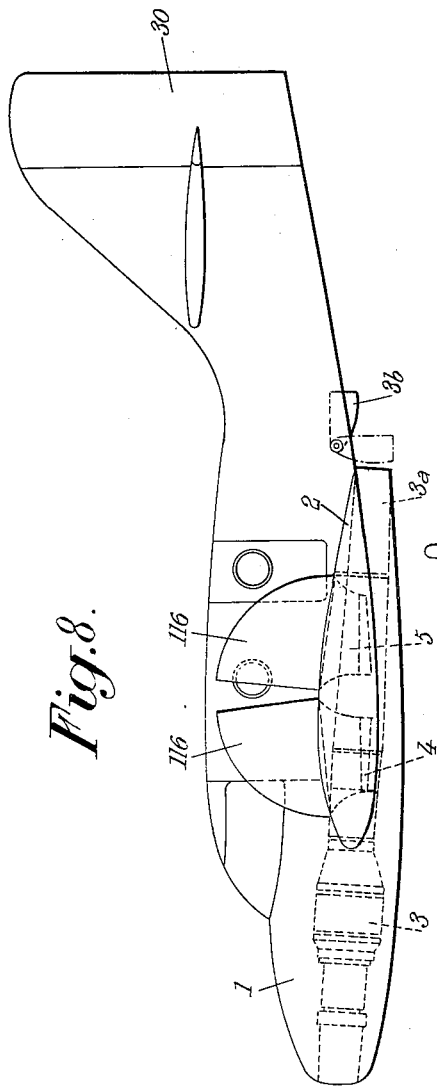
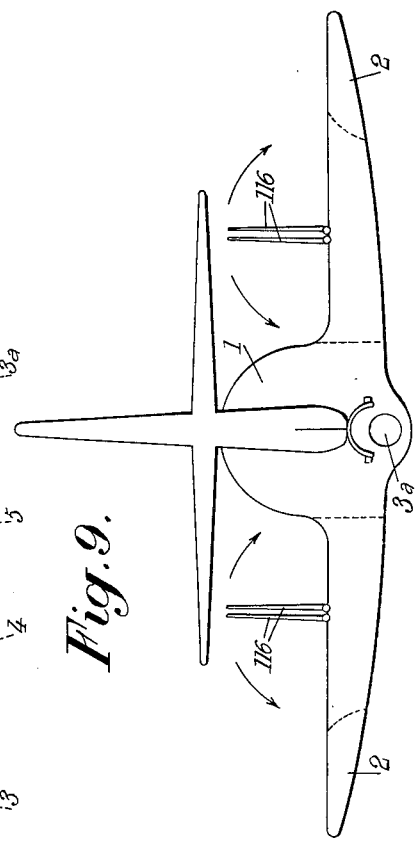
INVENTOR
Maurice Louis Hurel
BY
Bailey, Stephens & Huettig
ATTORNEYS

… … …

United States Patent Office 3,080,137
Patented Mar. 5, 1963

3,080,137
AIRCRAFT HAVING A LIFT PRODUCING ROTOR DISPOSED IN THE WING
Maurice Louis Hurel, 119 Rue Perronet, Neuilly-sur-Seine, France; Jean Henri Bertin, 1 Rue Delau, Neuilly-sur-Seine, France; and Marcel Pierre Le Nabour, 6 Rue V. Hugo, Montreuil sous Bois, France
Filed Nov. 14, 1958, Ser. No. 773,989
Claims priority, application France Nov. 19, 1957
2 Claims. (Cl. 244—12)

The present invention relates to aircraft having a lift producing rotor disposed in the wing, that is to say to aircraft including at least one bladed rotor capable of producing the lift of the aircraft, said rotor being housed in a duct extending throughout a supporting surface of the aircraft. The invention is more especially concerned with an aircraft of this kind in which said rotor means are capable of developing a lift enabling the aircraft to take off and to land vertically.

According to an essential feature of the present invention, there is provided in said duct, in the vicinity of the upper end thereof and above said rotor, a grid consisting of a plurality of elongated streamlined elements having their leading and trailing edges at right angles to the longitudinal axis of the aircraft, the chords of the aerofoil-shaped cross-sections of said grid elements being nearly parallel to the axis of said rotor, whereby the flow of air through said duct is improved.

Preferred embodiments of our invention will be hereinafter described with reference to the accompanying drawings, given merely by way of example and in which:

FIGS. 1 to 3 show, respectively in elevational view, in plan view with parts cut away and in rear view, a vertical take-off aircraft including two lift producing rotors disposed in the wing, said aircraft being made according to the invention.

FIGS. 2a and 2b show, on an enlarged scale, two modifications of a switching device illustrated on FIG. 2.

FIG 4 is a plan view showing one of the ducts provided in the wing of the aircraft.

FIG. 5 is a diametral view on the line V—V of FIG. 5.

FIG. 6 is also a diametral section of the duct of one of the rotors of the aircraft, said duct being provided with an air inlet grid made of streamlined elements provided with lift increase devices.

FIG. 7 is a diametral section of the duct of the lift producing rotor, said duct being provided with an inlet grid provided with streamlined elements at least some of which are movable.

FIGS. 8 and 9 are views, similar to FIGS. 1 and 3, illustrating a modification.

The apparatus illustrated by the drawings includes a fuselage 1, a wing 2, a jet propulsion power plant including a turbo-jet engine 3 adapted to give the apparatus a flying speed sufficient to enable wing 2 to supply the necessary lift and two bladed rotors 4. Each of said rotors is housed in a duct 5 having a substantially vertical axis provided in wing 2, the two ducts being disposed symmetrically on either side of the longitudinal plane of symmetry of the aircraft, each of these ducts extending throughout the wing.

Rotors 4, which are capable of supplying a lift sufficient to enable the aircraft to take off, are provided with gas turbine bladings 6 coaxial therewith and onto which are directed jets of hot gases under pressure supplied from the turbo-jet engine 3.

When determining the shape and dimensions of wing 2, it is necessary to take into account the necessity of giving a sufficient height to ducts 5 (so that they have a good efficiency) and of making their upper ends of flaring shape so as to facilitate the inflow of air. This makes it necessary to give wing 2 a shape, in plan view, such that it is possible to inscribe in every half-wing, coaxially with the corresponding rotor 4, a circle the diameter of which is equal to at least 1.5 that of said rotor.

As for the condition relating to the height of the duct, it implies the choice, for the thickness of wing 2, if it is desired to have a wing of acceptable aerodynamic qualities, of a value such that the ratio of the thickness to the chord of the wing does not exceed a predetermined value which depends upon the normal flying speed of the aircraft, said predetermined value averaging 15% for a flying speed of 700 km./h.

On the other hand, for aerodynamic reasons, it is desirable to choose for wing 1 an aspect-ratio ranging from 2 to 5, the optimum value of said aspect-ratio depending upon the ratio of the total weight of the aircraft to the thrust developed by turbo-jet engine 3. Thus for instance, when this ratio averages 3, the optimum value of the aspect-ratio is substantially equal to 3.

In view of the conditions above stated, wing 2 should have a useful area substantially equal to four times the total area of the two rotors 4.

Finally, the center of gravity of the aircraft should be located to about 35% of the depth or chord of wing 2 so that, in view of the dimensional conditions above referred to, it is advisable to give the wing a sweep-back angle ranging from 30 to 45°.

The turbo-jet engine 3 is preferably disposed in fuselage 1 at the level of wing 2 and ahead of the lift producing rotors 4.

Owing to this, it is possible to adopt a satisfactory shape (that is to say a shape having a sufficiently large radius of curvature) of the conduits and nozzles 7 intended to connect the discharge of turbo-jet engine 3 with the bladings 6 for the drive of rotors 4.

On the other hand, this corresponds to the condition above stated concerning the position of the center of gravity of the aircraft.

In view of the fact that the turbo-jet engine 3 is thus given a position relatively near the front of the aircraft, its nozzle 3a opens from the fuselage 1 at a relaitvely great distance ahead of the rear end of said fuselage. It is therefore advantageous, in order to avoid a detrimental action of the jet on the rear portion of the fuselage, to give this rear portion an upward shape if wing 2 is a low wing (the rear portion of the fuselage should on the contrary be lowered if wing 2 is a high wing).

In order to send the gases produced by the turbo-jet engine 3, either to the nozzle of the utrbo-jet engine, or to feed nozzles 7 opening opposite the bladings 6 of the rotors, we may use one of the arrangements which will now be described.

According to a first embodiment illustrated by FIG. 2, we make use of a set of valves having their operating means interconnected so as to control the inlet of nozzle 3a and the inlets of nozzles 7. For this purpose for instance, we provide in nozzle 3a a valve 8 and in nozzles 7 valves 9, the means for operating said valves being interconnected in such manner that, when valve 8 is opened (normal flight), valves 9 are closed, and when said valve 8 is closed (taking-off and landing), said valves 9 are opened.

According to a second embodiment illustrated by FIG. 2a, we provide, opposite the opening of each of the feed nozzles 7 into a portion of jet nozzle 3a of quadrangular cross-section, two quadrangular half-valves 9a which may, according to the position they occupy, Either close both of the openings above referred to (position in solid lines) for horizontal flying, Or come into contact with each other along their front edges (position shown in dot-and-dash lines), thus shutting off the jet nozzle and connecting the output of the power plant with the feed nozzles 7 when the lift producing rotors must be brought into action.

It should be noted that valves $9a$ might be at least partly balanced, for instance by providing each of them, at the rear of its pivot axis, with an extension $9b$ (shown for the top valve $9a$ on FIG. $2a$).

According to a third embodiment illustrated by FIG. $2b$, switching of the gaseous stream is obtained by means of pneumatic deflecting means. For this purpose, advantageously, we provide upstream of the joint where feed nozzles 7 branch off from the propelling jet nozzle $3a$, On the one hand, at least two blowing nozzles $b_1$ disposed on either side of said point and directed toward the axis of flow, said nozzles $b_1$ being capable, when brought into action (as shown for the bottom nozzle $b_1$) of compelling the gaseous stream of flow through nozzle $3a$, And, on the other hand, at least two blowing nozzles $b_2$ housed in a streamlined body having its longitudinal plane located in the plane of symmetry of the system, said nozzles $b_2$ being directed toward the outside and capable, when they are brought into action (as shown for the top nozzle $b_2$), of compelling the gaseous stream to flow through the corresponding feed nozzle 7.

It therefore suffices, in order to feed gases to the lift producing rotors, to bring nozzles $b_2$ into play, and in order to operate propelling nozzle $3a$, to bring nozzles $b_1$ into action.

The feed of blowing nozzles $b_1$ and $b_2$ may advantageously be ensured by air under pressure collected from the compressor of the turbo-jet enbine 3.

It should be noted that the blowing nozzles might make with the direction of the main stream an angle ranging from 90° to 135° (inclination in the upstream direction).

We will now describe the arrangement of ducts 5 in order to improve the efficiency thereof.

According to an arrangement illustrated by FIGS. 5, 6 and 7, the bladed rotor 4 is located near the bottom of the corresponding duct 5, and there is provided in said duct, above said rotor and in the vicinity of the top end of the duct, an inlet grid constituted by a plurality of elements 10 extending at right angles to the longitudinal axis of the aircraft and the cross-sections of which are in the form of aerofoils. The chords of these aerofoils extend in directions, preferably variable from one element to the next one, close to the vertical. Said elements 10 are arranged in such manner as to facilitate the penetration of air into duct 5 and its flow toward rotor 4.

The cross-sections of elements 10 are preferably chosen in such manner that they can be attacked, without any danger of separation of the streamlines from the surfaces of these elements, by air streams attacking said sections with an angle of incidence ranging within limits as remote as possible from each other.

For this purpose, the aerofoil sections of elements 10 are made as thick as possible, the thickness ranging from 20 to 25% of the chord.

As for the individual setting of every element 10 (the general direction of the chords of elements 10 being close to the vertical, but preferably variable from an element to the other as already stated), it is advantageously determined in such manner that, when the horizontal speed of the aircraft is zero, the element 10 that is considered is attacked on its rear surface with the maximum possible negative incidence that does not produce a separation of the streamlines from the rear surface of said element.

In this way, we reduce as much as possible the incidence of attack of the elements (positive incidence) reached when the horizontal speed of the aircraft is maximum, which finally permits of reducing, for this maximum speed, the risk of separation of the streamlines from the rear surfaces of said elements 10.

It should be noted that if this risk of separation does not exist we may adopt, for every element 10, an initial setting such that the negative incidence of the air streams corresponding to a zero horizontal speed of the aircraft is lower than the limit incidence for which there are separations of the streamlines from the rear surface of the element 10 that is considered. It is then possible to reduce the drag of elements 10 in the air stream penetrating through the duct.

Anyway, the conditions above stated with respect to the individual setting of elements 10 lead to adopting, for said elements, a forward inclination which increases from the rear toward the front of the grid.

On the other hand, and always for the same purpose of avoiding separation of the streamlines from the rear surfaces of at least some of the elements 10, said elements may be provided with means similar to those used in connection with aircraft wings for opposing this separation of the streamlines from the surface of the aerofoils.

For instance, as shown by FIG. 6 for the first element 10 on the left, we may provide ahead of the leading edge of said element 10 a member 11 forming with said leading edge a slot 12 which considerably increases the maximum admissible positive incidence without separation of the streamlines.

We may also, as shown for the second element 10, blow air (advantageously collected from the compressor of the turbo-jet engine 3) through a nozzle or slot 13 provided in the trailing edge of the element in question; both of the above mentioned means may be used on the same element 10 as shown for the third one on FIG. 6.

When an element 10 is provided with a forward member 11 forming a slot between itself and the element, we may blow air through a nozzle or slot 14 provided in the trailing edge of said member 11 as shown for the fourth element 10 of FIG. 6. This arrangement may be combined with a blowing of compressed air through the trailing edge of element 10, as shown for the fifth element 10 of FIG. 6.

In the embodiments which have been described up to now, it has been supposed that the initial setting of elements 10 could not be changed, but we may also, as shown by FIG. 7, provide elements 10 which are capable of being adjusted, for instance by pivoting each of said elements about an axis 15 preferably substantially equidistant from the leading edge and the trailing edge of the element, all the elements being adjustable by a single control. Such a possibility of angular setting might also be applied to the front members 11 of the elements, or exclusively to said front members.

On FIG. 7, the first element 10 on the left is set in fixed position but provided with a front member 11 of adjustable incidence. The second element is of adjustable incidence but is not provided with a front member 11. The third element is provided with a front member 11, the whole of said element 10 and said member 11 forming a structure of adjustable incidence. The fourth element 10 is of adjustable incidence and is provided with a front member 11 the incidence of which may be adjusted with respect to that of said element 10.

Anyway the adjustable parts will be controlled by a single control device permitting a simultaneous adjustment of all of said parts.

Each of the ducts 5 will be provided with means located respectively at the top and at the bottom thereof, in order to restore the continuity of the upper and under surfaces of wing 2 when the duct is not in service.

Concerning the means for closing the top ends of the ducts, we may use either of two constructions which will now be described by way of example.

According to the first of these constructions (FIGS. 8 and 9) which is particularly suitable when the grid constituted by elements 10 is sufficient in itself to ensure a correct flow of air and to feed it perpendicularly to the plane of the rotor, the closing means are constituted by flaps 11b pivoted about axes parallel to the direction of displacement of the aircraft. The upper end of every duct can then be closed by four flaps 11b forming each a sector of 90°, adapted to be operated either gradually (with the possibility of stopping them in any intermediate position) or, on the contrary, to be stabilized only in closing or in opening position.

The second construction, illustrated by FIGS. 4 and 5, permits of further improving the conditions in which the air streams are collected and fed to the inlet of the duct. This construction will be particularly suitable in cases where the incidence of the elements 10 of the grid is not adjustable. According to this embodiment, the means for stopping the upper end of the duct are constituted by a plurality of flaps 16 extending perpendicularly to the longitudinal axis of the aircraft, said flaps being pivoted about axes 17 which are preferably located close to their trailing edges.

When the elements 10 of the grid are fixed, the whole is preferably arranged in such manner that each of the flaps 16 forms, for all angular positions thereof, with the corresponding element 10 of the grid, a slot 18 limited by the trailing edge of said flap 16 and by the leading edge of said corresponding element 10. Such a slot is favorable to a good flow of air. Preferably, in the opening position, flaps 16 have different angular positions and diverge from one another in the upward direction.

We provide control means for simultaneously operating all the flaps 16 for bringing them from their opening position to their closing position. Said control means should be arranged in such a manner as to cause every flap to have an angular displacement which is the more important as said flap is located at a greater distance toward the rear.

Finally, the control means should preferably be of an irreversible type.

For this purpose, as shown by FIGS. 4 and 5, every flap 16 is provided with three toothed sectors 19 (a middle sector and two end sectors), with the exception of the front flap 16a which is provided with only a middle sector.

Each sector 19 cooperates with a worm 20 fixed at the end of a shaft 21 extending at right angles to wing 2 and the other end of which carries a pinion 22.

The pinions 22 corresponding to middle sectors are controlled by an endless chain 23, the end toothed sectors being controlled by another endless chain 24 advantageously driven by the same engine 25 (either hydraulic or electric) as endless chain 23.

It should be noted that it will be possible, in this case, to obtain different angular displacements, for the respective flaps 16 and for the same displacement of endless chains 23 and 24, by making a suitable choice of the ratio of transmission of the kinematic system (pinion 22, worm 20 and toothed sector 19) corresponding to every flap.

The means for closing the lower ends of ducts may be constituted, as shown by FIG. 5, by a plurality of flaps 26 extending in a direction parallel to flaps 16 and preferably pivoted about axes 27 located in the vicinity of their leading edges. Said flaps 26 are subjected to the action of a control device making it possible to operate them simultaneously so that, when they pass from their maximum opening position (vertical direction corresponding to a horizontal flying speed equal to zero) to their closing position when the aircraft is starting to fly horizontally, they occupy at any time a position for which they impart to the fluid flowing through the rotor a rearward impulse preferably greater than, or at least equal to, the momentum of this fluid before it has been sucked in by the lift producing rotor.

On the other hand, the rear part of wing 2 may advantageously be provided with an aerodynamic lift increase device, such for instance as a flap 28, which may be of any suitable type known in the art.

The lift increase device provided at the rear of wing 2 will have for its effect, when it is in service, substantially to reduce, for the same lift coefficient, the incidence to be given to wing 2 in order to obtain this lift.

Thus for instance, in the case of a slot flap rotated through 65°, the incidence necessary for obtaining a given lift is reduced by about 25°, and this whatever be the lift.

It should be pointed out that, for normal cruising flight conditions, control of the aircraft is effected by means of the conventional control means (ailerons 29 and rudder 30) which are preferably statically and aerodynamically balanced.

For stationary flight and under transitory conditions, control of altitude and control of the direction are obtained by means of a jet deflector 3b (FIGS. 8 and 9) pivotable about a horizontal axis (FIGS. 8 and 9) provided for this purpose at the rear of the propelling nozzle 3a of the turbo-jet engine 3.

Piloting of an aircraft made as above described is performed as follows:

For taking-off, the whole power of the engine is supplied to the lift producing rotors and the aircraft takes off vertically.

In order to start the aircraft in horizontal flight, the pilot lowers the wing flaps 28 to the maximum angle and operates the control means to pitch the aircraft down at an angle of about 25°. Then he gradually turns the lower flaps 26 toward the rear. The horizontal component of the reaction of the air stream deflected by these lower flaps 26 gives the aircraft an acceleration sufficient to impart a relatively high horizontal speed thereto. The pilot can then level off, close the rotor ducts by the means above mentioned and transfer the power of the engine to the rear propelling jet nozzle, after which the wing flaps 28 are returned into normal flying position.

In order to land the aircraft supposed to be in fast horizontal flight, the pilot stops the feed of gas to the propelling jet nozzle, gradually lifts the nose of the apparatus and then rotates the wing flaps 28 to increase the lift so that the horizontal flying speed can be sufficiently reduced. He then supplies power gases to the bladings of the lift producing rotors, opens the ends of the rotor ducts, reduces the power of the lift producing rotors once the horizontal speed of the apparatus has become zero and reestablishes the power of the lift producing rotors to a higher value when the aircraft comes close to the ground so as to land with a vertical speed as low as possible.

Some dimensions corresponding to aircraft to be made according to the invention will be hereinafter given:

| | | |
|---|---|---|
| Area | sq. m | 21 |
| Span | m | 8.80 |
| Aspect-ratio | | 2.8 |
| Overall length | m | 10.50 |
| Diameter of fuselage | m | 1.80 |
| Total weight | kg | 3700 |
| Thrust of the turbo-jet engine | kg | 1350 |

The performance of such an aircraft is to be as follows:

| | |
|---|---|
| Cruising speed at an altitude of 9000 m | 700 km./h. |
| Radius of action | 800 km. |
| Speed upon starting in a horizontal flight | 50 m./s. in 30 sec. |
| Upward speed | 8 m./s. |

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What is claimed is:

1. An aircraft which comprises, in combination, a supporting wing provided with a duct extending throughout it and substantially at right angles thereto, a lift producing rotor journalled in said wing coaxially with said duct and on the inside thereof, a gas operated motor operatively connected with said rotor for driving it, a reaction nozzle carried by said aircraft and extending in the fore-and-aft direction thereof, means carried by said aircraft for producing power gas, means for connecting the output of said power gas producing means either with said motor for driving said rotor or with said nozzle for jet propulsion from said nozzle, and a lift increase flap mounted on the trailing edge of said wing, and a tail unit extending behind the rear edge of the wing and having elevator means thereon.

2. An aircraft which comprises, in combination, a supporting wing provided with a duct extending throughout it and substantially at right angles thereto, a lift producing rotor journalled in said wing coaxially with said duct and on the inside thereof, a grid mounted in said duct above said rotor and in the vicinity of the upper end of said duct, said grid consisting of a plurality of streamlined elements having aerofoil-shaped cross-sections and having their leading and trailing edges at right angles to the longitudinal axis of the aircraft, the chords of said aerofoil-shaped cross-sections being slightly inclined upwardly toward the front with respect to the rotor axis, the inclinations of said cross-sections gradually increasing from the rear of the grid to the front thereof, whereby the flow of air through said duct is improved, a gas operated motor operatively connected with said rotor for driving it, a reaction nozzle carried by said wing and extending in the fore-and-aft direction thereof, means carried by said wing for producing power gas, means for connecting the output of said power gas producing means either with said motor for driving said rotor or with said nozzle for jet propulsion from said nozzle, and a lift increase flap mounted on the trailing edge of said wing.

References Cited in the file of this patent

UNITED STATES PATENTS

| | | |
|---|---|---|
| 2,576,700 | Schneider | Nov. 27, 1951 |
| 2,777,649 | Williams | Jan. 15, 1957 |
| 2,825,532 | Kadosch et al. | Mar. 4, 1958 |
| 2,940,689 | Howell | June 14, 1960 |